United States Patent [19]

Yuyama

[11] 4,441,331

[45] Apr. 10, 1984

[54] AIRCONDITIONER WITH REFRIGERANT TEMPERATURE RESPONSIVE CONTROLLER FOR COMPRESSOR BYPASS VALVE

[75] Inventor: Hiroshi Yuyama, Shizuoka, Japan

[73] Assignee: Mitsubishi Denki Kabushiki Kaisha, Tokyo, Japan

[21] Appl. No.: 372,239

[22] Filed: Apr. 26, 1982

[30] Foreign Application Priority Data

May 7, 1981 [JP] Japan .................. 56-68553

[51] Int. Cl.³ .................. F25B 41/00; F25B 29/00
[52] U.S. Cl. .................. 62/196.3; 165/29
[58] Field of Search .......... 62/160, 196 R, 196 A, 62/196 C, 324.6, 196 B, 196.1, 196.3, 196.2, 196.4, 199, 200; 165/29

[56] References Cited

U.S. PATENT DOCUMENTS

| | | | |
|---|---|---|---|
| 3,212,284 | 10/1965 | Henderson | 62/160 X |
| 3,240,028 | 3/1966 | Redfern et al. | 62/160 X |
| 3,563,304 | 1/1969 | McGrath | 165/2 |
| 3,777,508 | 12/1973 | Imabayashi et al. | 62/324 |
| 4,065,938 | 1/1978 | Jonsson | 62/160 |
| 4,137,726 | 2/1979 | Watada | 62/196 C |
| 4,179,894 | 12/1979 | Hughes | 62/160 X |

Primary Examiner—Henry C. Yuen
Assistant Examiner—Harry Tanner
Attorney, Agent, or Firm—Wenderoth, Lind & Ponack

[57] ABSTRACT

Present invention is to provide a heat pump type airconditioner wherein during warming, a refrigerant is successively circulated through a compressor—an indoor heat exchanger—an outdoor heater equipped with a refrigerant heating mechanism—the compressor and wherein a bypass circuit it disposed which includes a solenoid valve for the communication between the delivery side and suction side of the compressor; characterized in that a refrigerant temperature at an outlet of the refrigerant heating mechanism is sensed, that the solenoid valve is opened to bypass the refrigerant at the starting of the operation, that is, at the starting of the compressor, while the solenoid valve is closed when the refrigerant temperature has reached a predetermined temperature owing to heating and that the refrigerant heating mechanism is turned OFF after the refrigerant temperature has risen up to a predetermined temperature.

3 Claims, 4 Drawing Figures

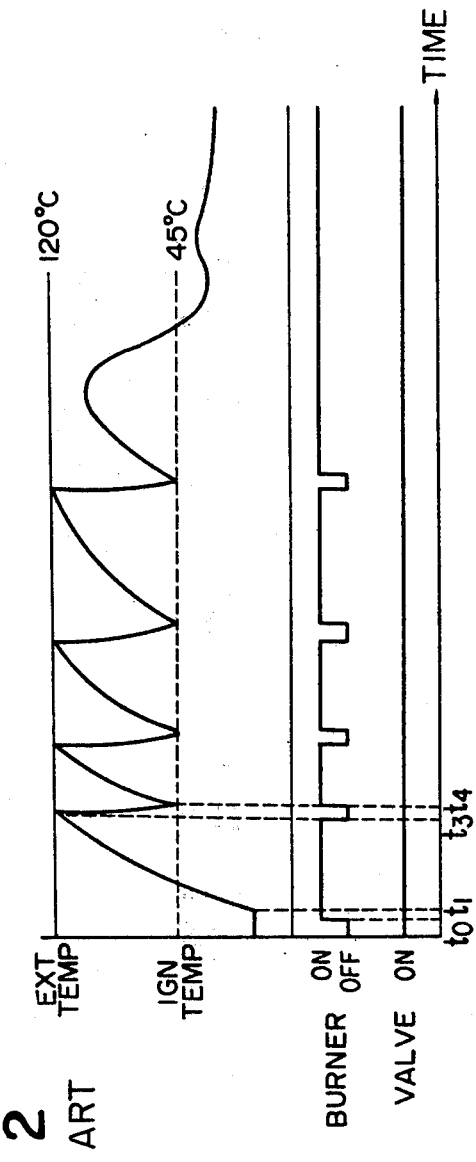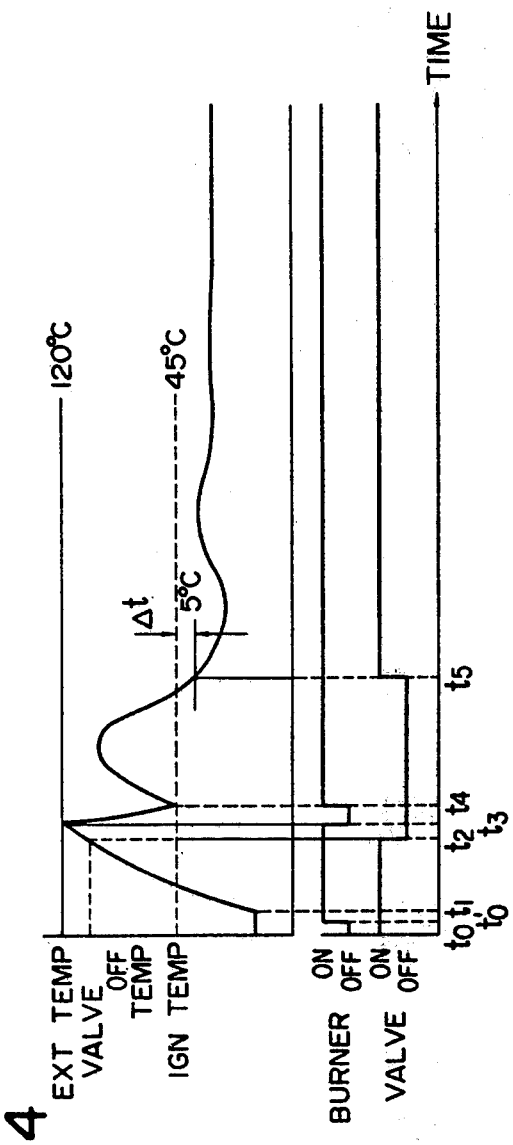

AIRCONDITIONER WITH REFRIGERANT TEMPERATURE RESPONSIVE CONTROLLER FOR COMPRESSOR BYPASS VALVE

BACKGROUND OF THE INVENTION

1. Field of the Invention

The present invention relates to a heat pump type airconditioner in which a heat source in a warming mode is a heater.

2. Description of the Prior Art

In general, heat pump type airconditioners employing an ambient air heat source have numerous merits, e.g. they are safe, the energy utilization efficiency is high and cooling and warming can be performed with an identical machine. This system, however, involves such essential disadvantages that when the temperature of the outdoor air falls, the warming capability deteriorates to a point such that the desired warming is impossible, and that various troubles attributed to frost on the parts of the apparatus occur. Airconditioners in which a combustor for kerosene, town gas or the like is incorporated in the unit with a cooling device are free from the disadvantages of the aforementioned heat pump type apparatus employing an ambient air heat source, but they have the disadvantage that the initial cost is high.

As a cooling and warming apparatus making the best use of the features of both the types of airconditioners, there has recently been proposed a system in which, in a cooling mode, a refrigerant is circulated in order through a compressor—an outdoor heat exchanger—a pressure reducing device—an indoor heat exchanger—and the compressor so as to perform cooling, while in a warming mode, the refrigerant is circulated in order through the compressor—the indoor heat exchanger—an outdoor side heater provided with a heating mechanism—and the compressor so as to perform warming (as, for example, U.S. patent application Ser. No. 362,838, filed Mar. 29, 1982 in the name of Tamotsu Nomaguchi et al, corresponding to Japanese Patent Application No. 55-137408, by Mitsubishi Denki Kabusiki Kaisha).

FIG. 1 shows a prior-art refrigeration circuit in a heat pump type airconditioner provided with a refrigerant heating mechanism. In the cooling mode, a refrigerant delivered from a compressor 1 is led by a four-way transfer valve 2 to an outdoor heat exchanger 3 where the refrigerant is condensed. After passing through a check valve 5, the liquid refrigerant has its pressure reduced by a throttle mechanism 7, and it is evaporated by an indoor heat exchanger 9 so as to cool a room. The flow of the refrigerant is controlled by the four-way transfer valve 2 again so as to bring the refrigerant back to the compressor 1.

In the warming mode, the refrigerant circulation circuit is changed-over by the four-way transfer valve 2 as follows. First, the refrigerant at a high temperature is condensed by the indoor heat exchanger 9, giving up heat to the room, and the liquid refrigerant is passed through a check valve 8 of a bypass circuit which is connected in parallel with the throttle mechanism 7. Then the refrigerant is circulated through a check valve 6 to a refrigerant heating heat exchanger 4, being blocked by the action of the check valve 5 disposed on the downstream side of the outdoor heat exchanger 3. After the refrigerant is heated and evaporated in the heat exchanger 4, it passes through the four-way valve and returns to the compressor again.

In addition, there is provided a compressor bypass circuit 10 which is provided with a solenoid valve 11 and which connects the delivery side and suction side of the compressor 1. The bypass circuit 10 functions as follows. In the cooling mode, when the cooling load is small, the valve 11 is opened to divert refrigerant from the main circuit so that energy-converting airconditioning can be carried out during which the cooling capability is kept low so that the electric power input to the compressor can be reduced. In the warming mode, specifically at the beginning thereof, the valve 11 is kept open until the circulation state or circulation rate, the temperature, etc. of the refrigerant which is heated by the refrigerant heating heat exchanger employing a combustor of town gas, kerosene or the like reaches a predetermined stable state. In another aspect of use, for the same purpose as in the cooling mode, when the warming load is small, the valve 11 is opened, and the thermal input to the refrigerant heating mechanism is simultaneously reduced, whereby the warming capability is adjusted.

However, when employing an external heat source such as a burner which is at a temperature higher than that of the ambient air, heat is radiated into the lower temperature ambient air by the heat exchanger in the above described prior art system, and the heating efficiency deteriorates. Therefore, a method has been considered in which, in the warming mode, the heat exchanger in the prior art apparatus is filled up with the refrigerant in its liquid phase so as to reduce the heat radiation to the utmost. With this method, however, the quantity of the refrigerant within the circuit becomes too large, resulting in the disadvantage that in the cooling mode the compressor is difficult to start when beginning the cooling mode.

In case of the prior-art refrigeration circuit provided with the refrigerant heating mechanism as shown in FIG. 1, when the refrigerant heating is initiated simultaneously with the starting of the compressor at the beginning of the warming, the operating state becomes as shown in FIG. 2. The temperature of the ambient air is low in the warming condition. Therefore, at the time $t_1$ at which the warming is begun, the refrigerant accumulates in the outdoor part of the refrigeration circuit, particularly the refrigerant heating mechanism and the outdoor heat exchanger. Immediately after the starting, accordingly, the circulation rate of the refrigerant is very great, and liquid compression is liable to occur. Moreover, a long time passes before a steady state is reached.

Besides, in the refrigerant heating mechanism, a steady heating capability is provided at the same time as the initiation of its operation at a time $t_0'$, so that the temperature of the refrigerant on the suction side of the compressor becomes very high. This is prone to adversely affect the refrigerant, refrigerating machine oil in the circuit, and the compressor. More particularly, in the refrigerant heating mechanism which employs the combustion heat of town gas, kerosene or the like as the refrigerant heating source, the adjustment of the combustion capability is difficult, and hence the aforementioned disadvantage is conspicuous. When the temperature of the refrigerant on the suction side of the compressor has reached a predetermined upper limit at a time $t_3$, the refrigerant heating is stopped, and the operation of the compressor is continued. When the suction side temperature has fallen to a predetermined point at a time $t_4$, the refrigerant heating is initiated again. After such steps have been repeated several times, there is established the state in which the refrigerant temperature does not reach the upper limit requiring the stopping of the refrigerant heating, so a stable operation can then be obtained.

With the above method, however, the ON/OFF operations of the heater, such as the burner, are repeated many times until the stable state is established. Therefore, the method needs a long time for producing a warm temperature in the room, and it cannot compensate for the disadvantage of an insufficient warming capability at a low temperature of the ambient air unless the conventional heat pump type airconditioner is provided with the refrigerant heating mechanism. Moreover, disadvantages exist related to misfire of the burner as well as safety and to the life of the equipment.

With the heat pump type airconditioner of this sort, when a compressor having the required capability for the cooling mode is installed, the refrigerant bypasses the throttle mechanism during the warming mode. During the steady operation, therefore, the circulation rate of the refrigerant is much larger than in the cooling mode, and the warming capability becomes too high. Moreover, since the frequent repetition of the ON/OFF operations of the combustor is attended with difficulty, the solenoid valve is normally kept open so as to bypass the refrigerant therethrough. The effect of preventing the liquid compression of the refrigerant at the beginning of the operation is also expected from the opening of the bypass valve. In spite of the foregoing step, however, the airconditioner of this sort has, even in the warming mode, the disadvantage of the frequent repetition of the ON/OFF operations of the combustor and the inferior warming effect on the room.

SUMMARY OF THE INVENTION

The present invention has been made in order to eliminate the above-stated disadvantages, and consists in causing part of a compressed refrigerant to flow from the delivery side of a compressor to the suction side thereof.

Another object of the present invention is to improve the peformance and reliability of the airconditioner in such a way that the opening of the solenoid valve of the bypass circuit during the warming operation is determined by the temperature or circulation state of the refrigerant on the suction side of the compressor during the warming.

Still another object of the present invention is to provide a heat pump type airconditioner wherein during warming, a refrigerant is successively circulated through a compressor—an indoor heat exchanger—an outdoor heater equipped with a refrigerant heating mechanism—and the compressor and wherein a bypass circuit is provided which includes a solenoid valve for connection between the delivery side and suction side of the compressor; characterized in that the refrigerant temperature at an outlet of the refrigerant heating mechanism is sensed, the solenoid valve is opened to bypass the refrigerant at the time of start up of the operation, that is, at the starting of the compressor, while the solenoid valve is closed when the refrigerant temperature has reached a predetermined temperature owing to heating, and the refrigerant heating mechanism is turned OFF after the refrigerant temperature has risen to a predetermined temperature; or characterized in that the solenoid valve is opened again upon confirmation of the fact that the refrigerant temperature has fallen to a predetermined temperature after the refrigerant heating has been stopped, and a stable shift state has been established without arrival at a refrigerant heating-stopping temperature even after restarting of the heating and the temperature has become lower than the refrigerant heating-stopping temperature by a predetermined amount.

BRIEF DESCRIPTION OF THE DRAWINGS

FIG. 2 is a graph showing the operation control characteristics of the prior art airconditioner.

FIG. 4 is a graph showing the operation control characteristics of the heat pump type airconditioner according to the present invention.

DETAILED DESCRIPTION OF THE PREFERRED EMBODIMENTS

Figure 1:
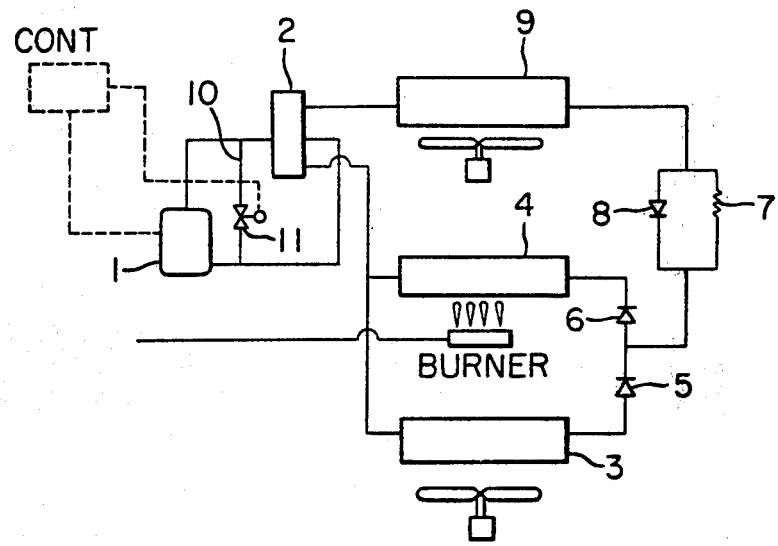
FIG. 1 is a diagram of a refrigeration circuit in a prior-art, heat pump type airconditioner provided with a refrigerant heating mechanism.
Figure 3:
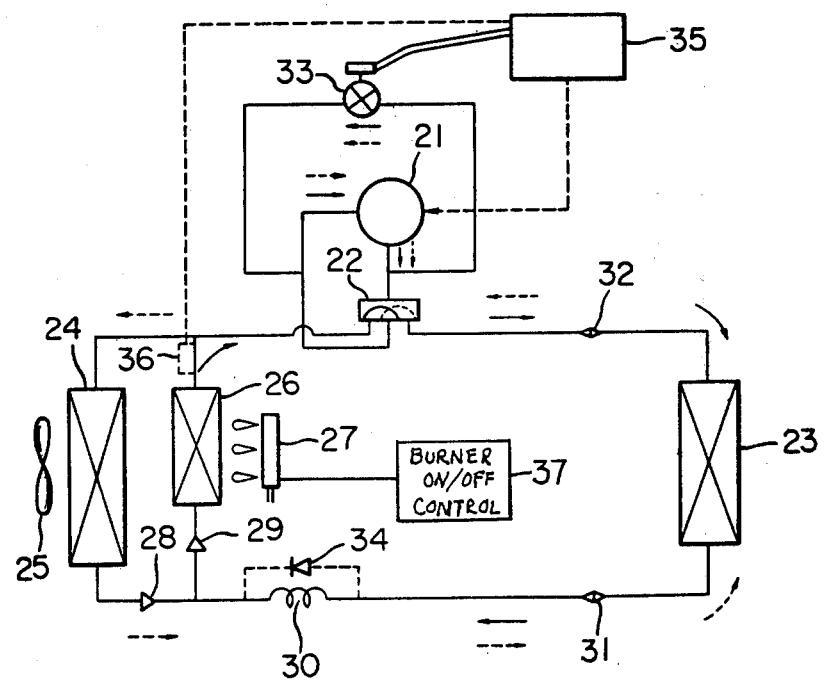
FIG. 3 is a digram of a refrigeration circuit in an airconditioner according to the present invention.

An embodiment of the present invention will now be described. FIG. 3 is a refrigerant flow diagram showing the arrangement of the embodiment.

In the figure, numeral 21 designates a compressor, numeral 22 a four-way valve, numeral 23 an indoor heat exchanger, numeral 24 an outdoor heat exchanger which exchanges heat with the ambient outdoor air by means of a fan 25, and numeral 26 a heating heat exchanger which exchanges heat with a heat source, such as a burner 27, operating at a higher temperature than the ambient outdoor air.

Numerals 28 and 29 indicate check valves which are arranged in series with the outdoor heat exchanger 24 and the heating heat exchanger 26 and which cut off flows reverse to the senses of the arrowheads, respectively. Numeral 30 indicates a throttling capillary tube which is connected at one end with the indoor heat exchanger 23 through a first coupling 31. Numeral 34 indicates a check valve which is connected in parallel with the capillary tube 30 and which enables refrigerant to bypass the capillary tube 30 during operation in the warming mode. Numeral 32 indicates a second coupling which is interposed between the indoor heat exchanger 23 and the four-way valve 22. Further, numeral 33 indicates a solenoid valve which is disposed midway of a compressor bypass pipe that brings the delivery side and suction side of the compressor 21 into direct communication, and which can control flow in the direction of the arrow. Numeral 35 indicates a controller which is connected to the solenoid valve 33 and the compressor 21 and in which an operation switch for the compressor 21 and a timer (not shown) are contained.

Now, the operations of the airconditioner as described thus far will be explained. It will be understood that this is an apparatus having parts in common with the present invention, and is the invention of Chikashi Kohzuma and is described and claimed in copending application Ser. No. 370,549, filed Apr. 21, 1982.

First, in the cooling mode, a refrigerant flows as indicated by broken line arrows under the action of the four-way valve 22, and it cools a room or rooms by radiating heat into the ambient outdoor air while being condensed within the outdoor heat exchanger 24 and by absorbing heat while being evaporated within the indoor heat exchanger 23.

During the above cooling operation, the solenoid valve 33 is usually closed. This valve is usually opened during a warming operation. The reason is as follows. In the warming operation, the temperature of the heat source 27 is high, so that the pressure in the refrigerating circuit increases and the refrigerant delivery rate of the compressor 21 increases so as to be in excess of the rate during the cooling mode. Therefore, part of the delivered refrigerant is bypassed by the solenoid valve 33 to the suction side of the compressor 21 from the delivery side thereof.

Further, in the warming mode, part of the refrigerant evaporated within the heating heat exchanger 26 is condensed by exchanging heat with the ambient outdoor air in the outdoor heat exchanger 24, so that the warming capability is reduced. In order to prevent this, the circuit is overfilled with the refrigerant to the extent that all the refrigerant contained in the outdoor heat exchanger 24 is in is liquid phase. In such a state, the condensation no longer takes place and the heat radiation is suppressed. However, because the quantity of the refrigerant required to maintain this state is large, liquid compression develops especially at the beginning of the operation of the compressor 21, and the electric motor (not shown) of the compressor 21 is subjected to an excess load and becomes incapable of starting in some cases. This phenomenon is also influenced by the difference between the delivery side pressure of the compressor 21 (higher pressure) and the suction side pressure thereof (lower pressure), and it is obvious that the starting is more difficult the greater the difference. Accordingly, the phenomenon is more liable to occur during the cooling mode in which the solenoid valve 33 is usually closed, than in the beginning of the warming mode during which the solenoid valve 33 is open.

In order to prevent this drawback, the present invention adopts the following measure. Even during the cooling mode, at the beginning of the cooling in which it is supposed that a large amount of liquid will return to the compressor 21, the solenoid valve 33 is kept open for a predetermined time, for example 1 to 2 minutes, by the use of the timer. When the distribution of the refrigerant in the refrigerant circuit has been stabilized to the extent that the liquid return no longer takes place, the solenoid valve 33 is closed.

According to the above apparatus, the difference between the pressures of the high pressure side and the low pressure side becomes small at the beginning of the cooling mode, and the motor of the compressor 21 can start even when return of the refrigerant liquid to the compressor has occurred.

Secondly, in the warming mode, the refrigerant flows as indicated by the solid line arrows under the action of the four-way valve 22, and it warms the indoors by absorbing heat while being evaporated within the heating heat exchanger 26 by means of the burner 27 and by radiating heat while being condensed within the indoor heat exchanger 23.

Hereunder, the apparatus and a control method therefor used during the warming mode of the airconditioner as described above will be described in detail with reference to FIG. 4. The apparatus according to the present invention as shown in FIG. 3 has added to the above described airconditioner a refrigerant temperature detecting means 36 constituted by a thermistor or the like.

It is incorporated in a refrigerant pipe on the outlet side of the refrigerant heating heat exchanger 26, and it sends the detected refrigerant temperature to the controller 35 so as to control the ON/OFF operation of the solenoid valve 33.

At a time $t_o'$ immediately after the starting of the compressor 21, the burner 27 is ignited by the burner ON/OFF control 37. In order to prevent liquid compression immediately after the starting, the solenoid valve 33 is opened at a time $t_o$ as in the above described airconditioner. The refrigerant temperature at the outlet of the refrigerant heating heat exchanger 26 remains constant for a short period of time on account of the thermal capacity of this heat exchanger as well as the refrigerant piping. Thereafter, the effect of the heating appears, and the aforementioned temperature begins to rise rapidly at a time $t_1$. At this time, the circulation rate of the refrigerant is still small, and hence the refrigerant within the refrigerant heating heat exchanger in the two-phase state gasifies. Since the thermal capacity of the gas is small, the sensible-heat change is predominant, and super heat increases and is absorbed by the compressor 21. Therefore, the temperature of the refrigerant reaches the point at which the combustion is to be stopped at a time $t_3$ after a short period of time as in the warming mode operation described previously. When the refrigerant heating is stopped, the refrigerant temperature falls. Further, the solenoid valve 33 is closed at a time $t_2$ which is substantially the same as the time when the burner is extinguished. Therefore, the refrigerant delivered from the compressor 21 is no longer bypassed, and the circulation rate of the refrigerant cycle increases. Accordingly, the refrigerant temperature at the outlet of the refrigerant heating heat exchanger 26 at this time falls in a shorter period of time than in the above described operation. Meanwhile the circulation rate of the cycle increases, so that the operating state of the compressor 21 and the refrigerant distribution in the refrigerant cycle are stabilized quickly. For this reason, the aforementioned refrigerant temperature at the outlet falls, and it reaches the point at which the burner is to be ignited again at a time $t_4$. Even when the refrigerant heating is started, the refrigerant temperature rises again, but it then falls without reaching the point at which the burner is to be extinguished. Meanwhile the solenoid valve 33 is kept closed as in the above described operation.

That is, when the compressor 21 is first started, the solenoid valve 33 is opened in order to prevent the liquid compression, and the refrigerant on the lower pressure side is distributed by the operation during this period. Therefore, even when the solenoid valve 33 is opened at time of the next ignition of the burner 27, the refrigerant temperature does not reach the extinguishing temperature. In some operating conditions, however, the extinguishing temperature will be reached. In this case, the same operation as at the first ignition is repeated. Even when the operation is repeated once or twice, it is not repeated many times as is in the prior art.

Typical values for the times $t_o \sim t_5$, the ignition temperature, and the extinguishing temperature in FIG. 4, are as follows: $t_o' \sim t_1 = 1$ minute; $t_1 \sim t_2 = 50 \sim 55$ seconds; $t_2 \sim t_3 =$ a few seconds such that $t_1 \sim t_3 = 1$ minute (i.e. $t_2 \sim t_3 = 1$ minute less $t_1 \sim t_2$); $t_3 \sim t_4 =$ a few seconds; $t_4 \sim t_5 = 2$ minutes: Ignition temperature = 45° C.; Extinguishing temperature = 120° C.; $\Delta t = 5°$ C.

Further, the present invention is characterized in that the solenoid valve 33 is closed for a period of time ($t_3 \sim t_2$) before the extinguishing temperature of the burner 27 is reached. In case the solenoid valve is turned OFF simultaneously with the burner, the refrigerant temperature rises even after the extinguishing and becomes too high. If the extinguishing temperature is set in advance so as to be low, the ON duration of the burner is short and the number of the ON/OFF steps of the burner 27 increases, so that a long period of time passes before the stable state is reached.

In addition, if the refrigerant temperature has fallen to the lower state without reaching the extinguishing temperature in spite of the ignition and continued operation of the burner 27, the solenoid valve 33 is opened at the time $t_5$ when the refrigerant temperature has become lower than the ignition temperature by a predetermined temperature difference ($\Delta t$). This indicates that the initial operation has shifted to a stable operation. The time it takes for the refrigerant to stabilize, which it does when the refrigerant reaches 40° C., is about ten minutes.

In this manner, the present invention reduces the number of the ON/OFF steps of the burner 27. In consequence, the warming is quickened, and the dangers such as misfire are reduced, so that the safety and the reliability are remarkably improved.

What is claimed is:

1. A heat pump type airconditioner comprising refrigerant compression means; a first heat exchanger disposed indoors and which functions as an evaporator during a cooling mode of operation and as a condenser during a warming mode of operation; a second heat exchanger disposed outdoors and which functions as a condenser during the cooling mode of operation; a third heat exchanger for heating the refrigerant during the warming mode of operation to increase the temperature thereof to a temperature higher than the outdoor air; heating means operatively associated with said third heat exchanger for providing heat to the third heat exchanger and having means for turning said heating means off when a higher predetermined refrigerant temperature is reached and turning said heater means on when a lower predetermined refrigerant temperature is reached; said compression means and heat exchangers being connected in a refrigeration circuit for operating in the cooling mode and the warming mode when refrigerant is circulated therethrough in the proper direction; a compression means bypass pipe connected between the higher pressure side and the lower pressure side of said compression means; valve means connected in said bypass pipe for controlling the flow of refrigerant through said bypass pipe; temperature sensing means on the outlet side of said third heat exchanger for sensing the temperature of the refrigerant from said third heat exchanger during the warming mode operation when said heating means is operating; and control means to which said temperature sensing means is connected and connected to said valve means for closing said valve means during normal cooling mode operation and keeping said valve means open at the start of the warming mode of operation and responsive to said temperature detecting means for closing said valve means when a higher predetermined sensed temperature of the refrigerant is reached and opening said valve means when a lower predetermined sensed temperature is reached.

2. An airconditioner as claimed in claim 1 in which said control means comprises means responsive to said temperature sensing means to close said valve means when said temperature sensing means senses a refrigerant temperature just below the higher predetermined refrigerant temperature at which the heating means is turned off.

3. An airconditioner as claimed in claim 1 in which said control means comprises means responsive to said temperature sensing means to open said valve means when said temperature sensing means senses a refrigerant temperature slightly below the lower predetermined refrigerant temperature at which the heating means is turned on.

* * * * *